United States Patent [19]
Burns et al.

[11] Patent Number: 5,399,120
[45] Date of Patent: Mar. 21, 1995

[54] AIR CONDITIONING SYSTEM CONTROL VALVE

[75] Inventors: Ronald T. Burns, Newfane; William D. Wright, Lyndonville; Gary C. Victor, North Tonawanda, all of N.Y.

[73] Assignee: General Motors Corporation, Detroit, Mich.

[21] Appl. No.: 147,516

[22] Filed: Nov. 5, 1993

[51] Int. Cl.⁶ .............................................. B60H 1/26
[52] U.S. Cl. .................... 454/126; 454/121; 454/159
[58] Field of Search ............... 454/121, 126, 159, 160, 454/161

[56] References Cited
U.S. PATENT DOCUMENTS

| | | |
|---|---|---|
| 2,634,669 | 4/1953 | Greenmun . |
| 4,216,822 | 8/1980 | Izumi .................................. 165/42 |
| 5,025,711 | 6/1991 | Cassidy . |
| 5,062,352 | 11/1991 | Ostrand ............................... 454/121 |
| 5,070,770 | 12/1991 | Cassidy ............................... 454/160 |

FOREIGN PATENT DOCUMENTS

| | | | |
|---|---|---|---|
| 1071000 | 8/1954 | France | ................. 454/159 |
| 1359909 | 3/1964 | France | ................. 454/121 |
| 3119557 | 3/1982 | Germany | ............ 454/121 |
| 3421323 | 12/1985 | Germany | ............ 454/121 |

*Primary Examiner*—Harold Joyce
*Attorney, Agent, or Firm*—Patrick M. Griffin

[57] ABSTRACT

A combined mode and temperature control valve for an HVAC housing includes a cylindrical sleeve rotatable within a stationary barrel. Hot or cold air enters lengthwise inlet slots in one side of the barrel located below or above a stationary dividing baffle in the housing. Air entering the barrel can exit to either a heater outlet, defroster outlet, or A/C outlet. The sleeve includes slots and openings which, when rotated continuously through a predetermined increment, open and close the hot and cold inlets in complementary fashion to allow in a full temperature range of hot or cold air, which mixes inside the hollow cylinder. The sleeve opens only one outlet at a time, blocking the other two, over the increment of rotation.

1 Claim, 5 Drawing Sheets

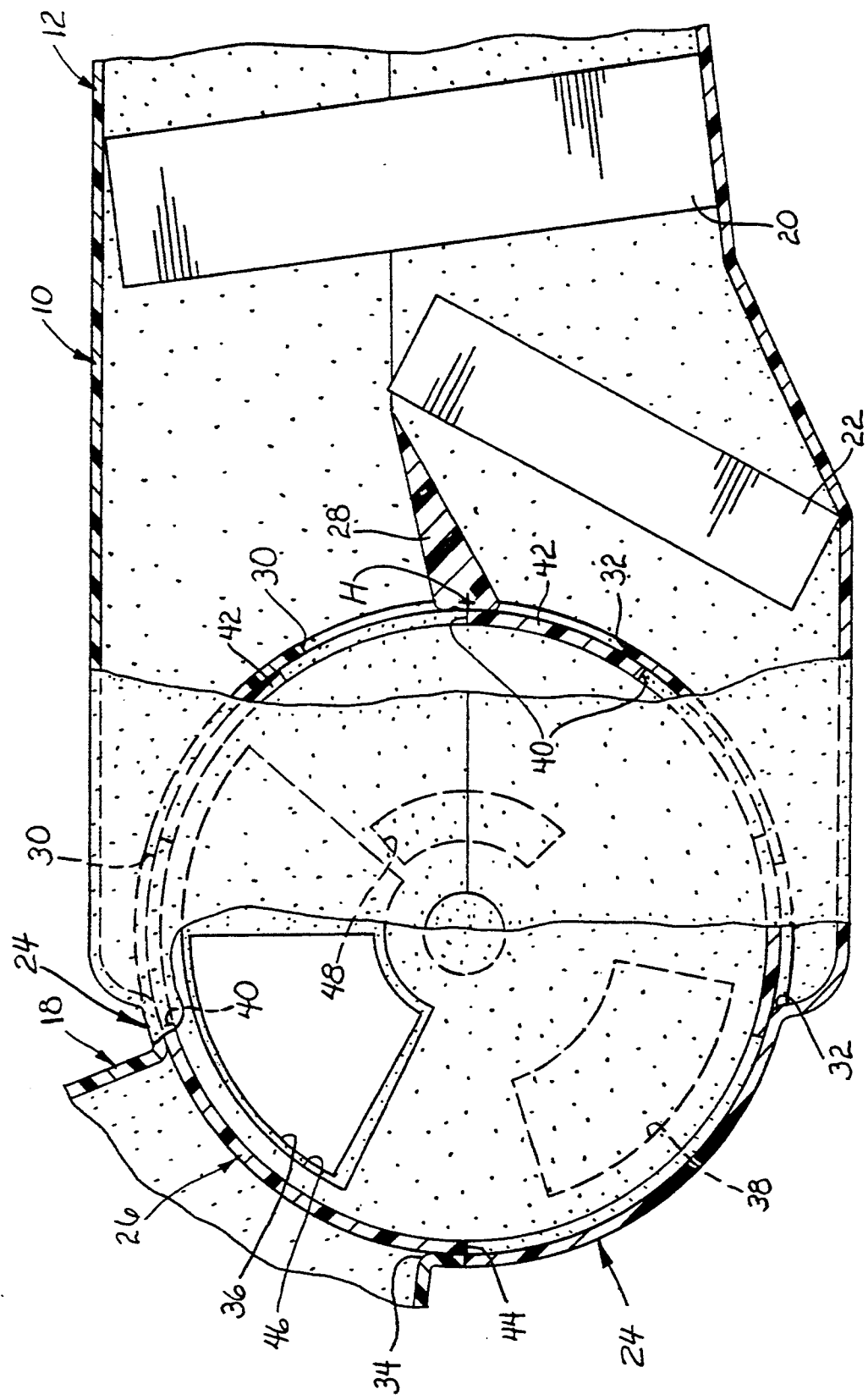

AIR CONDITIONING SYSTEM CONTROL VALVE

This invention relates to vehicle air conditioning and heating systems in general, and specifically to a simplified control means for such a system.

BACKGROUND OF THE INVENTION

Vehicle air conditioning system is a term used broadly enough to encompass both heating and cooling of interior air, as well as ventilation and defrosting of windshields. A typical system incorporates an evaporator core connected to a compressor and a heater core connected to the radiator, both secured inside a box like housing. Most commonly, the evaporator core is situated just behind the fresh air intake, and in front of the heater core. Therefore, all fresh air drawn into the system passes through the evaporator core first, regardless of whether the system is in a cooling or heating mode. In the heating mode, no refrigerant circulates in the evaporator core, so there is no cooling of the air even though it passes through it. While heated radiator coolant circulates continually in the heater core, a door within the housing controls temperature by deflecting air either totally or partially away from the heater core. At least two other movable doors are also needed within the housing for so called mode control, that is, for directing air into physical ducts that empty onto the windshield, toward the floor, or more directly at a vehicle occupant. These doors all need separate controls and actuators, which consumes space, has additional part count, and assembly cost.

SUMMARY OF THE INVENTION

The subject invention provides a single valve for controlling both temperature and mode. A housing includes an evaporator core filling all of the housing inlet, and a heater core, inboard of the evaporator, filling only the lower half of the housing. The valve consists of two hollow cylinders, a stationary outer barrel and rotatable inner sleeve. A planar baffle within the housing acts to direct any air that passes over the smaller heater core toward the bottom half of the core side of the barrel, while air that passes through the top half of the evaporator core, above the baffle and heater core, is directed at the top half of the core side of the barrel.

The operator's choice of mode and temperature turns the sleeve within the barrel and directs air into one of three discrete ducts, heater, defroster, or A/C, by a complexly interacting series of slots and openings. The core side of the stationary barrel has a pair of lengthwise slots located above the baffle, called the cold air inlet, to admit air that has passed through the evaporator core, and a pair of comparable slots located below the baffle, called the hot air inlet, to admit air that has passed through the heater core. On the outlet side of the barrel, a pair of circumferentially extending slots, called the A/C outlet, open into the cool air duct. The end caps of the stationary barrel have two arcuate openings, called the heater outlet and defroster outlet, which open into the heater duct and defroster duct respectively. The rotatable inner barrel has a series of five lengthwise, evenly spaced slots and five corresponding ribs, each comparable in length and width to the barrel's hot and cold air inlets. The sleeve also has a pair of circumferential slots, longer than the barrel circumferential slots, and located so as to be capable of overlapping therewith. Finally, each end cap of the rotatable sleeve has an arcuate opening opposed to its circumferential slot, and capable of overlapping with the heater and defroster outlets.

The various slots, ribs and end cap openings are relatively sized and angularly oriented so that the A/C, heater, and defroster outlets in the barrel are open one at a time, with the other two blocked by the sleeve as it rotates. The sleeve can turn far enough in each mode such that its ribs and slots either block the sleeve cold inlets and leave the hot inlets wide open, or vice versa, or any partial combination in between, thus determining a full range of temperatures in each mode.

DESCRIPTION OF THE PREFERRED EMBODIMENT

These and other advantages and feature of the subject invention will appear from the following written description, and from the drawings, in which:

FIG. 2 is a sectional view taken along the line 2—2 of FIG. 2;

Figure 1:
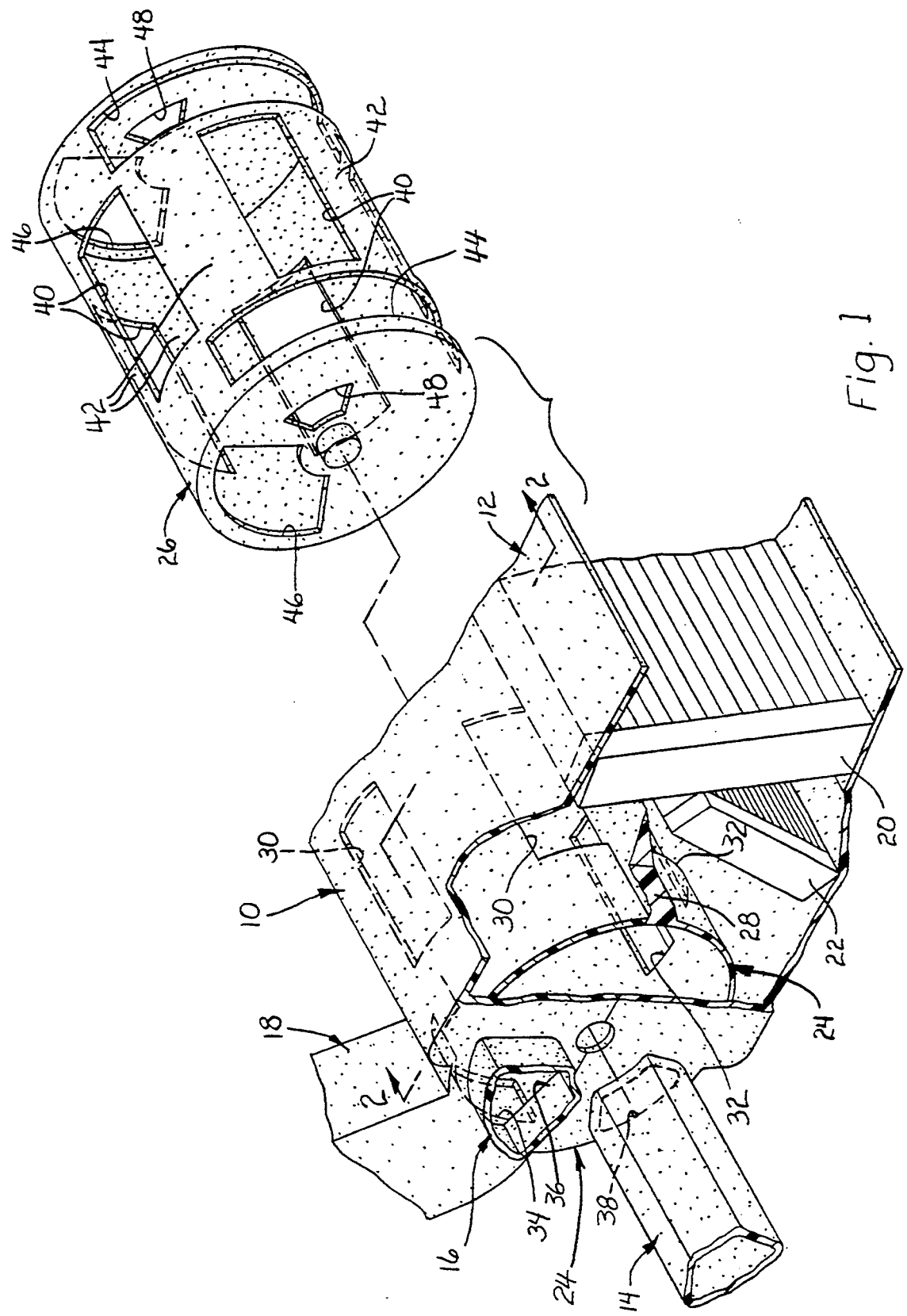
FIG. 1 is a perspective view of a housing, partially broken away to show the cores and the stationary sleeve, with the movable sleeve pulled out to the side.

Referring first to FIGS. 1 and 2, a so called HVAC housing 10 is a molded plastic box, molded in top and bottom halves that are joined together to enclose several other components described below. Housing 10 has on open forward inlet end 12, and is closed elsewhere but for a series of discrete ducts at the rearward end. These include a heater duct 14 and defroster duct 16, which extend out from each side of the back end of housing 10, and at least one, in fact a pair, of cool air or A/C ducts 18 that extend forwardly. Only one of each pair of ducts is illustrated. The defroster duct 16 would open onto a vehicle windshield, not illustrated, while both the heater duct 14 and A/C duct 18 ultimately are directed toward vehicle occupants by any desired system of vents or branching ducts. The components enclosed within housing 10 include a standard evaporator core 20 and heater core 22. Evaporator core 20 is located near the housing inlet end 12, tipped slightly inwardly, and fills substantially the entire inside of housing 10, so that all air entering inlet 12 passes over and through it. If the vehicle cooling system compressor is on, then evaporator core 20 is cold, acting as a source of cold air. If the outside temperature is low, ambient air alone is a sufficient source of cold air, and evaporator core 20 need not be on. Heater core 22 is smaller in area, and is located inboard of evaporator core 20, tipped in the opposite direction, but not touching it. Only about half the inside volume of housing 10 is effectively occupied by heater core 22, compared to evaporator core 20. Heater core 22 is always on, with a diverted portion of engine coolant passing through it, and so is always a source of heated air regardless of outside temperature.

Still referring to FIGS. 1 and 2, the valve assembly of the invention is comprised of two basic components, a stationary outer barrel, indicated generally at 24, and a rotatable inner sleeve, indicated generally at 26. Barrel 24 is molded in upper and lower halves integrally with the two halves of housing 10, and sleeve 26 is captured closely between the two halves, along with the cores 20 and 22, when housing 10 is assembled. As best seen in FIG. 2, the right side of barrel 24, which may be termed the core side or inlet side, generally faces the cores 20 and 22, while the left side, the outlet side, opens into the various ducts 14, 16 and 18. A baffle 28 generally divides the space inside housing 10 between heater core 22 and barrel 24, and also effectively bifurcates the inlet side of barrel 24. Therefore, air above, which has passed through evaporator core 20 alone, is directed toward the top half of the core side, and air below, which has passed through both cores 20 and 22, is directed toward the lower half of the core side. That air is sent in varying proportions to selected ones of the various ducts 14, 16 or 18 depending on a complicated interaction between barrel 24 and sleeve 26, described in more detail below.

Figure 3A:
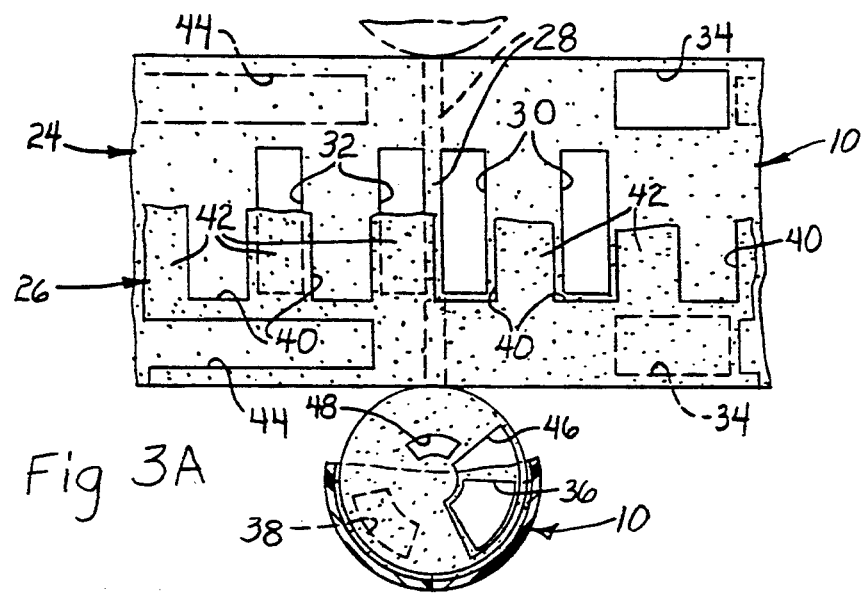
FIG. 3A is a view of the inner sleeve and outer sleeve cut and turned inside out, in effect, with one of the endcaps cut and folded out about the hinge point H, and with the circumference of each rolled out, and showing full cold temperature in the defrost mode.

Referring next to FIGS. 1 and 3A, barrel 24 and sleeve 26 both are cylindrical and hollow, with end caps and a circumferential wall. Beyond that, each is best described in terms of its voids and openings, rather than in terms of its solid portions, though both are necessary to the operation. An actuator, not illustrated, would turn sleeve 26 within barrel 24 to any desired position, which position would be determined by the overlap or non overlap of the various openings in the two. That interaction is best seen in the various FIGS. 3, views which were generated by effectively cutting of the end caps of each cylinder and folding them out about the arbitrary hinge point H in FIG. 2, with the circumference of the cylinder rolled out flat. Thus, what is being viewed is the inner layer of the valve on top, sleeve 26, with the outer layer below, barrel 24. Part of the end cap of barrel 24 is broken away, as shown by the dotted broken line. The specific details of barrel 24 and sleeve 26 are described next. Various slots and openings are described as having circumferential "lengths" or "widths" given in arc degrees, not actual inches or millimeters, so as to be more general.

Referring next to FIGS. 2 and 3A, the inlet side of barrel 24 has two parallel, lengthwise slots 30 located above baffle 28, which together constitute the cold air inlet. Outside air passing through cold inlet 30 will have passed above baffle 28, through evaporator 20. Cold inlets 30 encompass about twenty six degrees each, and are separated by about forty six degrees of solid. They do not run axially end to end, however, comprising only about half the total length, and centered so as to leave about one fourth of the length of the wall uncut at each end. Barrel 24 also has a pair of equal size slots 32, constituting hot air inlets, located below baffle 28. The two sets of barrel inlet slots 30 and 32 are separated by about ten degrees of solid. Again, the air passing below baffle 28 to hot air inlets 32 will have passed through both cores 20 and 22, but the evaporator core 20 may or not be cold, while heater core 22 will always be hot. The outlet side of barrel 24 includes a pair of circumferential slots 34, which comprise a cold air or A/C outlet. In fact, since barrel 24 is molded integrally with housing 10, the A/C outlets 34 are one and the same with the ends of the A/C ducts 18, but are best illustrated as separate slots for ease of illustration. A/C outlets 34 occupy the axial space not covered by the cold air inlets 30, are approximately sixty two degrees long, and separated from the uppermost slot 30 by about nine degrees of solid. The end caps of barrel 24 have two arcuate openings 36 and 38, each about sixty two degrees long and separated by about a forty six degree web of solid material. These are the defroster outlet and heater outlet, respectively, and, as with the A/C outlet 34, are really integral to the housing 10, but best depicted as separate openings. The defroster outlet 36 is radially wider than heater outlet 38, for a reason described below. The heater and defroster outlets 36 and 38 are located generally on the outlet side of barrel 24.

Referring next to FIGS. 1, 2 and 3A, sleeve 26 is very similar in overall size to barrel 24, just enough smaller to fit closely within it. The circumferential wall of sleeve 26 has a series of five lengthwise, evenly spaced and equal size slots 40 separated by five ribs 42, slightly axially longer than the barrel inlets 30 and 32. Being evenly spaced, each slot and rib 40 and 42 is thirty six degrees wide, in the circumferential sense, wider than either barrel inlet 30 or 32. Also, it will be noted that the total width of any two adjacent slots and ribs 40 and 42, seventy two degrees, is equal to the width of one of the two cold air inlets 30 (or one of the hot air inlets 32) plus the width of the solid web between, that is, twenty six plus forty six degrees for seventy two total. The width of any single rib 42 or slot 40, thirty six degrees, is equal to the width of either of the adjacent inlets 30 and 32, twenty six degrees, plus the ten degree solid between them. Sleeve 26 also has a pair of circumferential slots 44, which are comparable in axial width to the A/C outlets 34, but significantly longer in the circumferential sense, one hundred and forty four degrees. This is sufficient to encompass two ribs 42 and two axial slots 40, or four times thirty six degrees. Circumferential slot 44 begins even with the near edge of one axial slot 40 and ends at the near edge of the second axial slot 40 following, as best seen in FIG. 1. The end caps of sleeve 26 each have an arcuate opening 46 slightly radially wider than either barrel end cap opening 36 or 38, and approximately one hundred and eight degrees long in the circumferential sense. Thus, sleeve end cap opening 46 is equal in circumferential length to the total of either barrel end cap opening 36 or 38 and the solid between them, that is, sixty two plus forty six degrees. Finally, in the embodiment disclosed, the end cap of sleeve 26 has an arcuate, radially narrow bleed opening 48, circumferentially longer than the barrel defroster outlet 36, and located so as to overlap it under circumstances detailed below.

Figure 3B:
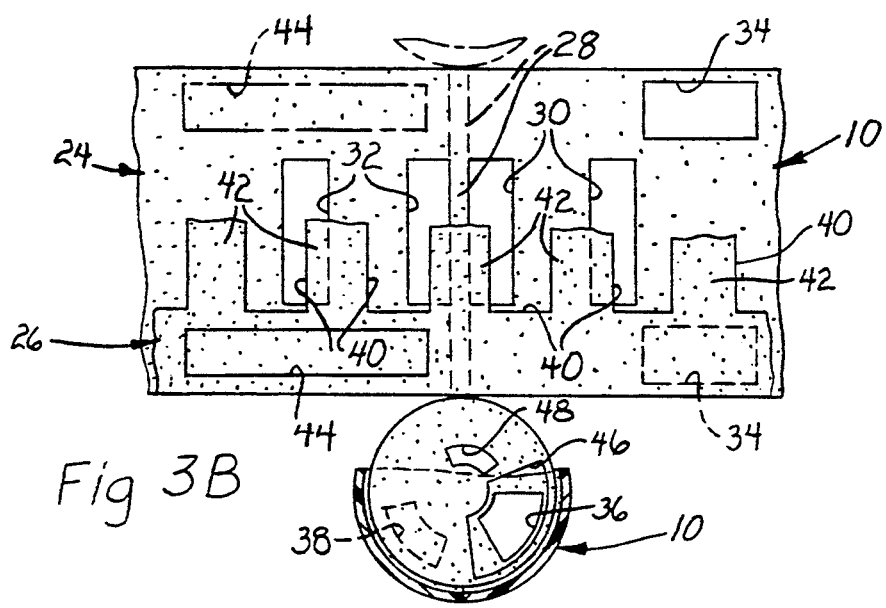
FIG. 3B is a view like FIG. 3A, but showing midrange temperature in the defrost mode.
Figure 3C:
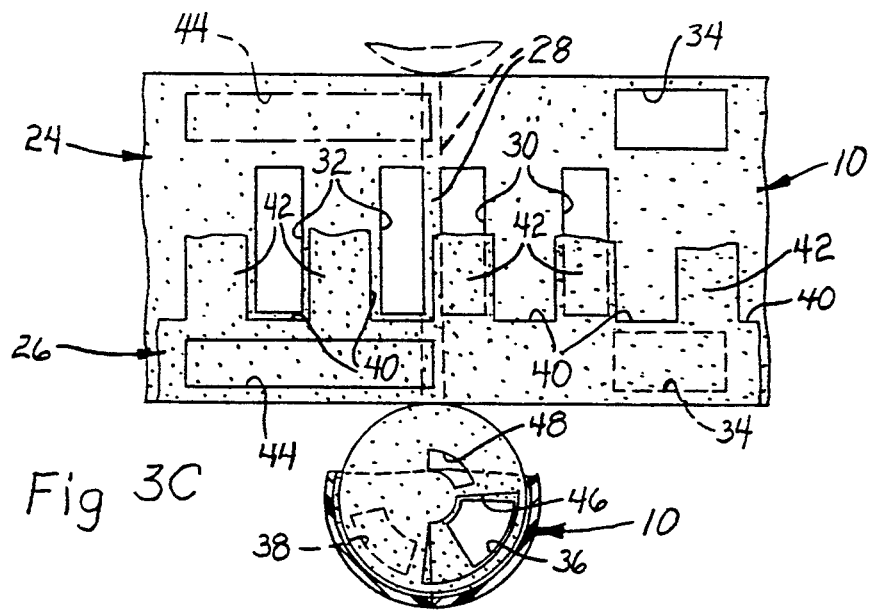
FIG. 3C shows full hot temperature in the defrost mode.

Referring next to FIGS. 3A through 3C, the operation of the invention in the defrost mode is illustrated. In general, the object is to direct heated air of various temperatures into the defroster duct 16, where it is sent to the windshield. When the operator chooses defrost mode, the actuator is programmed to twist sleeve 26 within barrel 24 until sleeve end cap opening 46 totally overlaps with the shorter barrel defroster outlet 36. In general, defroster outlet 36 is sufficiently shorter than sleeve end cap opening 46 (a differential of forty six degrees) that sleeve 26 can rotate over an increment that is in turn sufficient to give a full temperature range. Sleeve 26 needs to move only about thirty six degrees in order to cover the whole range, but the slot differential of forty six degrees is made larger to provide a degree of allowance or tolerance. The actuator would be programmed to rotate sleeve 26 through the approximately thirty six degree increment, back and forth, depending on what temperature the operator chooses. Specifically as can be seen by comparing FIGS. 3A through 3C, defroster outlet 36 moves (relatively moves) from one end of sleeve end cap opening 46 to the other as the sleeve slots 40 and ribs 42 concurrently move from completely opening cold inlets 30 and completely blocking hot inlets 32 (3A), to the converse (3C). FIG. 3B shows a fifty-fifty position. The hot and cold inlets 32 and 30 may be said to move in continuous and complementary fashion between blocked and open positions, that is, when one is all blocked, the other is all open, when one is ⅓ blocked, the other is ⅔ open, etc. The other barrel outlets, the heater outlet 38 and A/C outlet 34, are blocked by the sleeve 26, and remain so for all temperature positions in the defroster mode. In FIG. 3A, air entering barrel 24 has passed through evaporator core 20, above baffle 28, and not through heater core 22. The air can, if desired, be cooled by evaporator core 20, if the compressor is on, which will dehumidify the air. This would be true if the system controller were set up to have a so called defogging feature. If not, the air would be just ambient temperature. It is unlikely that the full cold position in defrost mode would be chosen, but it does represent a possible choice. In FIG. 3C, the opposite is true, and air entering barrel 24 will have passed through evaporator core 20 (whether it was cold or not), through heater core 22 (always hot), then below baffle 28 and through the lower lengthwise barrel slots 32. In between the two extremes, whatever mix of heated and cooled air passes through the inlets 30 and 32 swirls around and is mixed inside of the hollow sleeve 26 before it exits through the defroster outlet 36 (or whichever of the three possible outlets is open in any mode) This is one of the advantages of the system, in that no additional air mixing space or apparatus is needed.

Figure 3D:
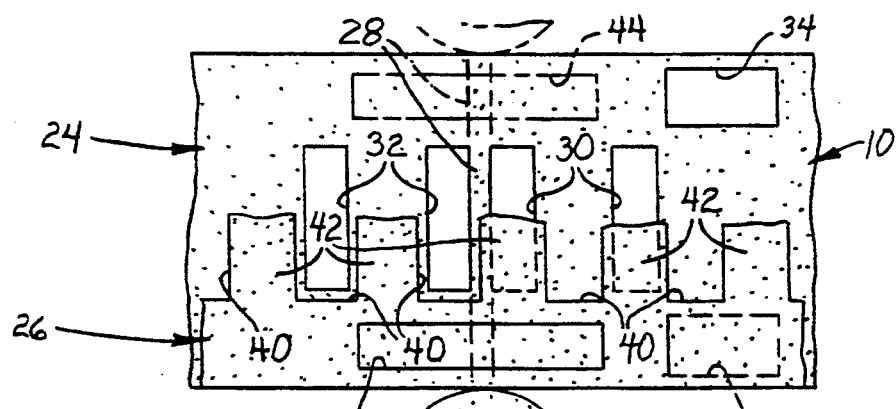
FIG. 3D shows full hot temperature in the heater mode.
Figure 3E:
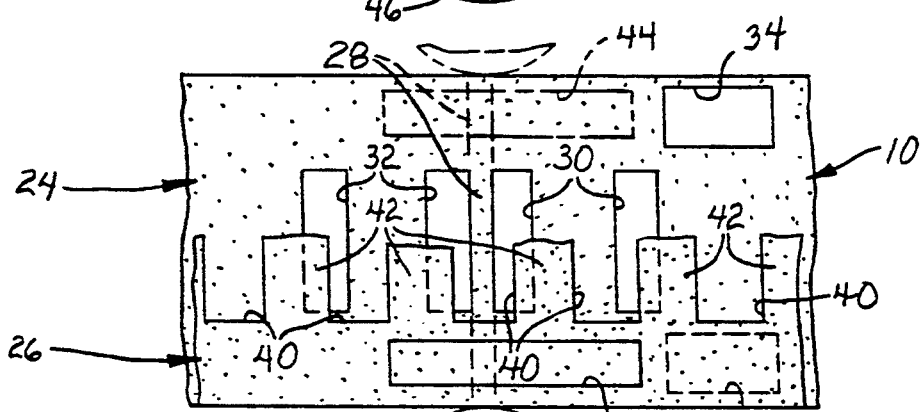
FIG. 3E shows midrange temperature in the heater mode.
Figure 3F:
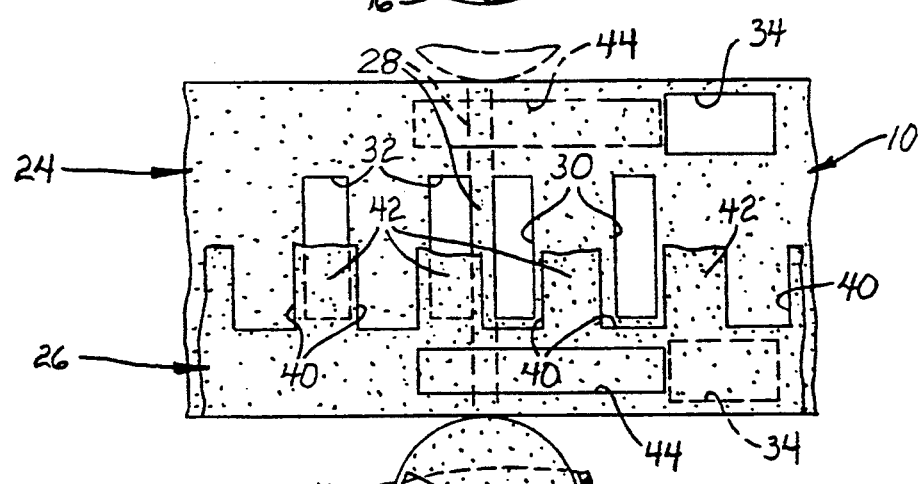
FIG. 3F shows full cold temperature in the heater mode.

Referring next to FIGS. 3D through 3F, the heater mode is illustrated. The size and orientation of heater outlet 38 relative to defroster outlet 36 (again, they are equal in degrees of circumferential length and separated by forty six degrees of solid material) is such that as sleeve 26 continuously rotates (clockwise from the perspective of FIG. 2, counter clockwise in FIG. 3D) over approximately seventy two degrees, sleeve end cap opening 46 leaves defroster outlet 36 and completely overlaps with heater outlet 38 instead. Concurrently a rib 42 and slot 40 advance far enough to once again completely block cold inlets 30 and open hot inlets 32, the full hot position in heater mode. The rotation of sleeve 26 in heater mode is very much like the defrost mode, except, of course that air is directed through the heater outlet 38 (and heater duct 14). A/C outlet 34 remains blocked, as does defroster outlet 36. As sleeve 26 rotates over the same increment, the cold and hot air inlets 30 and 32 are alternately blocked, open, or in a complementary state of partially blocked and partially open to give the same full temperature range. In heater mode, the evaporator core 20 would not be chilled, since heater mode would not be chosen in anything but cold weather, and cold ambient air passing above baffle 28 would be cold enough to mix with air heated by heater core 22 and give a mid range temperature. The only real qualitative difference between the defroster mode and heater mode is that the smaller bleed opening 48 in the end cap of sleeve 26 is oriented so as to overlap a small, radially innermost segment of defroster outlet 36 throughout the increment of rotation. This bleeds some air into defroster duct 16, which is generally preferred, since it is likely that the windshield will need at least some defrosting whenever heat mode is chosen.

Figure 3G:
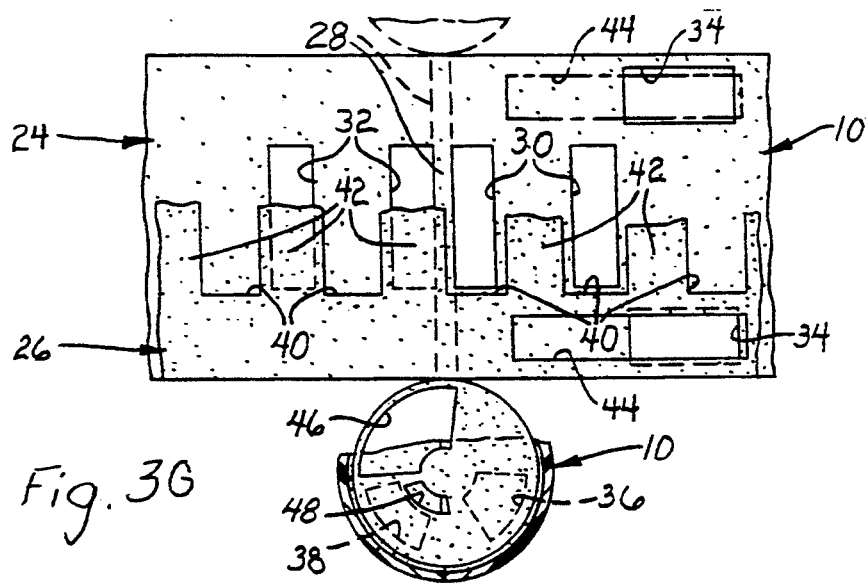
FIG. 3G shows the full cold temperature in the A/C mode.
Figure 3H:
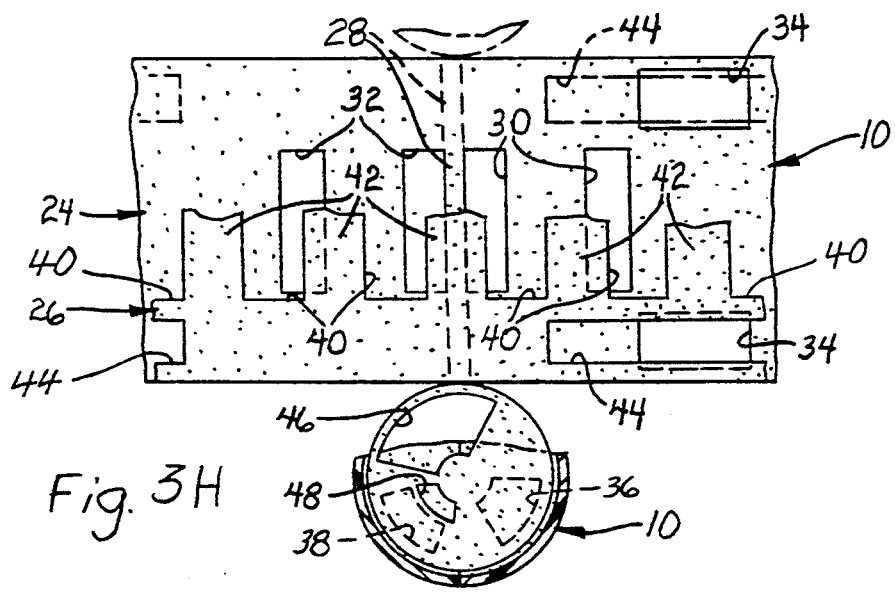
FIG. 3H shows the mid range temperature in the A/C mode.
Figure 3I:
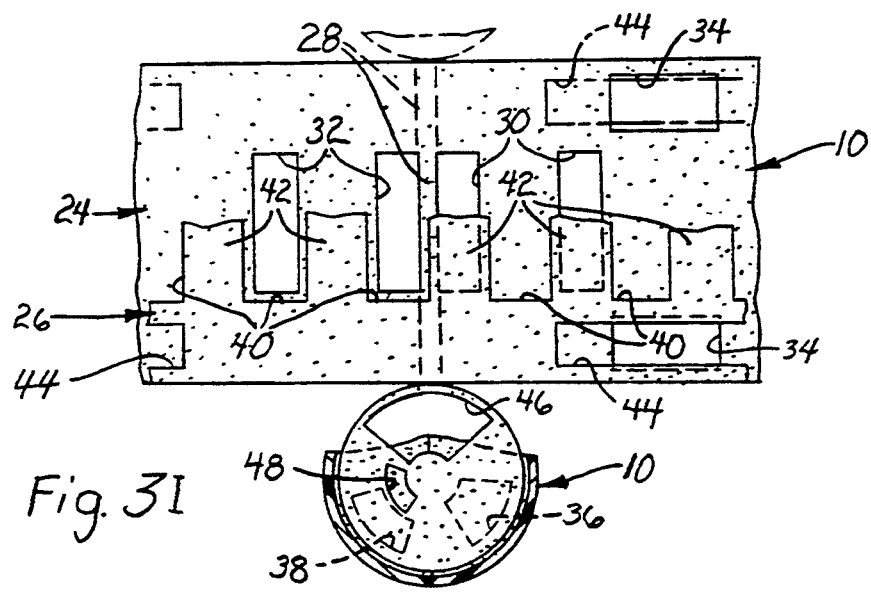
FIG. 3I shows the full hot temperature in the A/C mode.

Referring finally to FIGS. 3G through 3I, the A/C mode is illustrated. Here, the sleeve circumferential slots 44 have moved far enough (approximately sixty two degrees from the FIG. 3F position) to completely overlap and open the shorter barrel circumferential slots (A/C outlet) 34 and admit air to the A/C ducts 18. The sleeve circumferential slots 44 are more than sufficiently longer than the barrel circumferential slots 34 (one hundred forty four compared to sixty two degrees) so as to keep the barrel circumferential slots 34 (the A/C outlet) entirely open to A/C duct 18 for the entire thirty six degree increment of rotation. Since the end cap openings 46 and circumferential slots 44 are generally opposed sides of sleeve 26, the sleeve end cap openings 46 do not overlap with either of the barrel end cap openings 36 or 38 during the A/C mode. As with the other modes, the cold and hot inlets 30 and 32 may be blocked, open, or any complementary combination thereof in between. In FIG. 3G, the cold inlets 30 are fully open and the hot inlets 32 fully closed. In FIG. 3I, the opposite is true. FIG. 3H represents a midrange. During the A/C mode, the system controller would keep the compressor on and the evaporator core 20 cold. The heater core 22 is always on, so some heated air is mixed through the hot air inlets 32 with the cooled air passing through the cold air inlets 30. Typically, A/C mode is chosen only when the ambient outside air is hot, so it would not be absolutely necessary that heater core 22 be hot in order to obtain hot air to mix with the chilled air. However, it is not necessary to turn heater core 22 off, either, and it is possible simply to mix less of the hotter than ambient air with the cold air by programming the system to open the hot inlets 32 less and the cold inlets 30 more, for any given operator temperature choice within the A/C mode.

Variations in the disclosed embodiment could be chosen. As to stationary barrel 24, more or fewer cold or hot inlet slots 30 or 32 could be used. The cold and hot inlets 30 and 32 should be equal in size and number to each other, however, so that the evenly divided ribs 42 and slots 40 in sleeve 26 may be used to block and unblock them in complementary fashion in all modes, and over equal increments of continuous rotation of sleeve 26 in each mode. A single inlet and outlet slot twice as wide as 30 or 32 would provide equal inlet area, but sleeve 26 would have to turn over an increment twice as large to take each mode through the entire temperature range. By definition, the circumferential barrel slots 34 that represent the A/C outlet should be on the outlet side of the barrel 24, opposed to the inlets 30 and 32, but they could be longer or shorter, in the circumferential direction, so long as they were sufficiently shorter than the sleeve circumferential slots 44 so as to maintain an overlap and stay open through the entire A/C mode increment of rotation. So, too, the sleeve circumferential slots 44, of whatever length, should be generally on the opposite side of the cylinder from sleeve end cap opening 46, so that the barrel end cap openings 36 and 38 (the defroster and heater outlets) may remain closed during the entire A/C mode. Therefore, it will be understood that it is not intended to limit the invention to just the embodiment disclosed.

The embodiments of the invention in which an exclusive property or privilege are claimed are defined as follows:

1. A vehicle air conditioning system with combined mode and temperature control, comprising,
   a housing having a forward, open inlet end and a rearward end, said rearward housing end being closed but for discrete cool air, heater and defroster ducts,
   an evaporator core filling substantially all of said housing inlet end,
   a heater core between said evaporator core and housing rearward end filling approximately half of said housing inlet end,
   a substantially cylindrical, stationary barrel at said housing rearward end having a circumferential wall and end caps, said circumferential wall including an inlet side facing said housing inlet end and an opposed outlet side having a circumferential cool air outlet exposed to said cool air duct, a discrete arcuate end cap defroster outlet exposed to said defroster duct, and a discrete arcuate heater outlet exposed to said heater duct,
   a generally planar baffle within said housing extending between said heater core and said barrel and substantially bifurcating said barrel inlet side,
   said barrel inlet side further including a lengthwise cold inlet above said baffle and a lengthwise hot inlet below said baffle, and,
   a generally hollow sleeve rotatable within said stationary barrel including a series of lengthwise slots and ribs sized and angularly oriented so as to alternately block or open said barrel hot and cold inlets, or leave complementary portions thereof open and blocked as said sleeve continuously rotates over a predetermined angular increment within said barrel, said sleeve also having a circumferential slot and an arcuate end cap opening that is generally opposed to said circumferential slot and sized and angularly oriented relative to said barrel outlets so that only one of said three possible outlets remains open as said sleeve rotates over said increment while said hot and cold inlets are concurrently opened and closed in continuous, complementary fashion.

* * * * *